(12) United States Patent
Kurokawa et al.

(10) Patent No.: US 6,626,261 B1
(45) Date of Patent: Sep. 30, 2003

(54) ELECTRIC POWER STEERING APPARATUS

(75) Inventors: Takanori Kurokawa, Kashiwara (JP); Hirokazu Arai, Yamatokooriyama (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/657,976

(22) Filed: Sep. 8, 2000

(30) Foreign Application Priority Data

Sep. 8, 1999 (JP) .............................. 11-254891

(51) Int. Cl.$^7$ ................................................ B62D 5/04
(52) U.S. Cl. ...................... 180/444; 74/425; 74/DIG. 10
(58) Field of Search ................................ 180/444, 443; 74/388 PS, 425, DIG. 10, 457, 462, 458; 428/605, 607, 611, 474.7, 903, 298.1, 299.1, 299.4, 299.7, 364, 373; 29/893.37

(56) References Cited

U.S. PATENT DOCUMENTS

| | | | |
|---|---|---|---|
| 1,601,911 A | * 10/1926 | Godfrey | |
| 1,638,012 A | * 8/1927 | Hoof | |
| 3,931,094 A | * 1/1976 | Segal et al. | 264/211 |
| 4,543,288 A | * 9/1985 | Radvan et al. | 428/297 |
| 4,898,040 A | * 2/1990 | Tamba et al. | 74/DIG. 10 |
| 5,074,828 A | * 12/1991 | Ellis | 474/152 |
| 5,445,238 A | * 8/1995 | Chikuma et al. | 180/444 |
| 5,482,128 A | * 1/1996 | Takaoka et al. | 180/444 |
| 5,497,548 A | * 3/1996 | Schlenger et al. | 29/893 |
| 5,722,295 A | * 3/1998 | Sakai et al. | 74/DIG. 10 |
| 5,738,183 A | * 4/1998 | Nakajima et al. | 180/444 |
| 5,962,376 A | * 10/1999 | Yamazaki et al. | 508/106 |
| 6,025,062 A | * 2/2000 | Krenkel et al. | 428/293 |

FOREIGN PATENT DOCUMENTS

JP      A2556890      8/1997

* cited by examiner

*Primary Examiner*—Anne Marie Boehler
(74) *Attorney, Agent, or Firm*—Birch, Stewart, Kolasch & Birch, LLP

(57) ABSTRACT

An electric steering apparatus comprises an annular tooth portion and a metal boss portion fitted in the inside of the annular tooth portion. The annular tooth portion has teeth for engaging with a worm. The annular tooth portion is made of synthetic resin material mixed with fibers having a length with an aspect ratio between 100 and 800 so that the fibers are arranged preferably in a direction crossing the direction of the torque, which is applied to the teeth, thereby to heighten a fatigue strength of the teeth and the teeth root portions.

1 Claim, 6 Drawing Sheets

ELECTRIC POWER STEERING APPARATUS

BACKGROUND OF THE INVENTION

The present invention relates to an electric power steering apparatus using a motor as a power source for steering assists.

FIG. 1 shows a schematic cross sectional view of a conventional electric power steering apparatus. The electric power steering apparatus comprises a first steering shaft 2 connected with a steering wheel 1, a second steering shaft 4 connected with the first steering shaft 2 through a torsion bar 3, a torque sensor 5 for detecting the relative rotational displacement between the first and second steering shafts 2, 4, a motor 6 for steering assists, which is driven corresponding to the detected result of the torque sensor 5, and a reduction mechanism 9 having a worm 7 and a worm wheel 8 for reducing and transmitting the output power of the motor 6 to the second steering shaft 4. The operation of the steering mechanism corresponding to the turning of the steering wheel 1 is assisted by the rotation of the motor 6 so as to reduce the driver's burden during steering.

A worm shaft 10 is connected with the output shaft of the motor 6 and disposed to cross the shaft axis of the second steering shaft 4. The worm 7 is integrally formed FIG. 2 shows an enlarged cross sectional view of a worm wheel in an electric power steering apparatus disclosed in the Japanese Utility Model Publication No. 2556890. The worm wheel 8 comprises an annular tooth portion 81 and a boss portion 82. The annual tooth portion 81 is made of synthetic resin, and has teeth 8a engaging with the worm 7. The boss portion 82 is made of metal, and is engaging with the annular tooth portion 81 at the inside thereof. This structure allows not only [to reduce] the noise at the engaging of the worm wheel 8 and the worm 7 to be reduced, but also the processability of the teeth to be improved. The annular tooth portion 81 is made of nylon synthetic resin material mixed with glass fibers.

The glass fibers mixed in the nylon synthetic material, used in making the annular tooth portion of the conventional worm wheel, has an aspect ratio (ratio of the length to the diameter) of less than 100. Due to the small aspect ratio, the fatigue strength of the teeth projecting from the peripheral of the annular tooth portion and that of the root portion of the teeth was not sufficient. Thus, the improvement of the fatigue strength of the teeth and the root portion of the teeth were desired. More precisely speaking, the annular tooth portion is formed by injection molding, in which nylon synthetic material is injected into a mould by an injection screw. And at the injection, the glass fibers mixed into the synthetic resin material run along the stream of the synthetic resin material into the mould. As a result, the directions of the fibers in the annular tooth portion become same. Further, the aspect ratio of the fibers is smaller than 100, namely, the fibers are very short. Therefore, the fatigue strength of the teeth and that of the root portion of the teeth, where a strong torque is applied when the worm and worm wheel engages, was not sufficient.

BRIEF SUMMARY OF THE INVENTION

An object of the present invention is to provide an electric steering apparatus improved to solve the aforementioned problems.

The electric steering apparatus according to the present invention comprises a motor for steering assists, a worm, a worm wheel having an annular tooth portion made of synthetic resin with teeth engaging with the worm and having a metal boss portion fitted in the inside of the annular tooth portion, and a steering shaft to which an output from the motor is transmitted through the worm and the worm wheel thereby to assist steering, characterized in that the annular tooth portion is made of the synthetic resin material mixed with fibers having a length with an aspect ratio between 100 and 800.

According to the present invention, the annular tooth portion is made of synthetic resin material mixed with fibers having an aspect ratio between 100 and 800, therefore, even when the longitudinal direction of the fibers is substantially parallel to the direction of the stream of the synthetic resin material in the mould, the fibers can be arranged preferably in the direction crossing the direction of the torque, which is applied to the teeth. As a result, the fatigue strength of the teeth and the root portion of the teeth can be reinforced.

When the aspect ratio of the fibers is less than 100, it is impossible to preferably arrange the fibers in the direction crossing the direction of the torque, which is applied to the teeth. As a result, only small reinforcing effect of the teeth and the root portion of the teeth can be attained by the fibers, and the fatigue strength of the teeth and the root portion of the teeth is insufficient.

Conversely, when the aspect ratios of the fibers mixed into the synthetic resin material are over 800, the fibers are cut by the injection screw, so that the aspect ratio decreases to less than 800, namely the length of the fibers with an aspect ratio over 800 cannot be realized.

The above and further objects and features of the invention will more fully be apparent from the following detailed description with accompanying drawings.

BRIEF DESCRIPTION OF THE DRAWINGS

The present invention will become more fully understood from the detailed description given herein below and the accompanying drawings, which are given by way of illustration only, and thus are not limitative of the present invention.

DETAILED DESCRIPTION OF THE INVENTION

Figure 1:
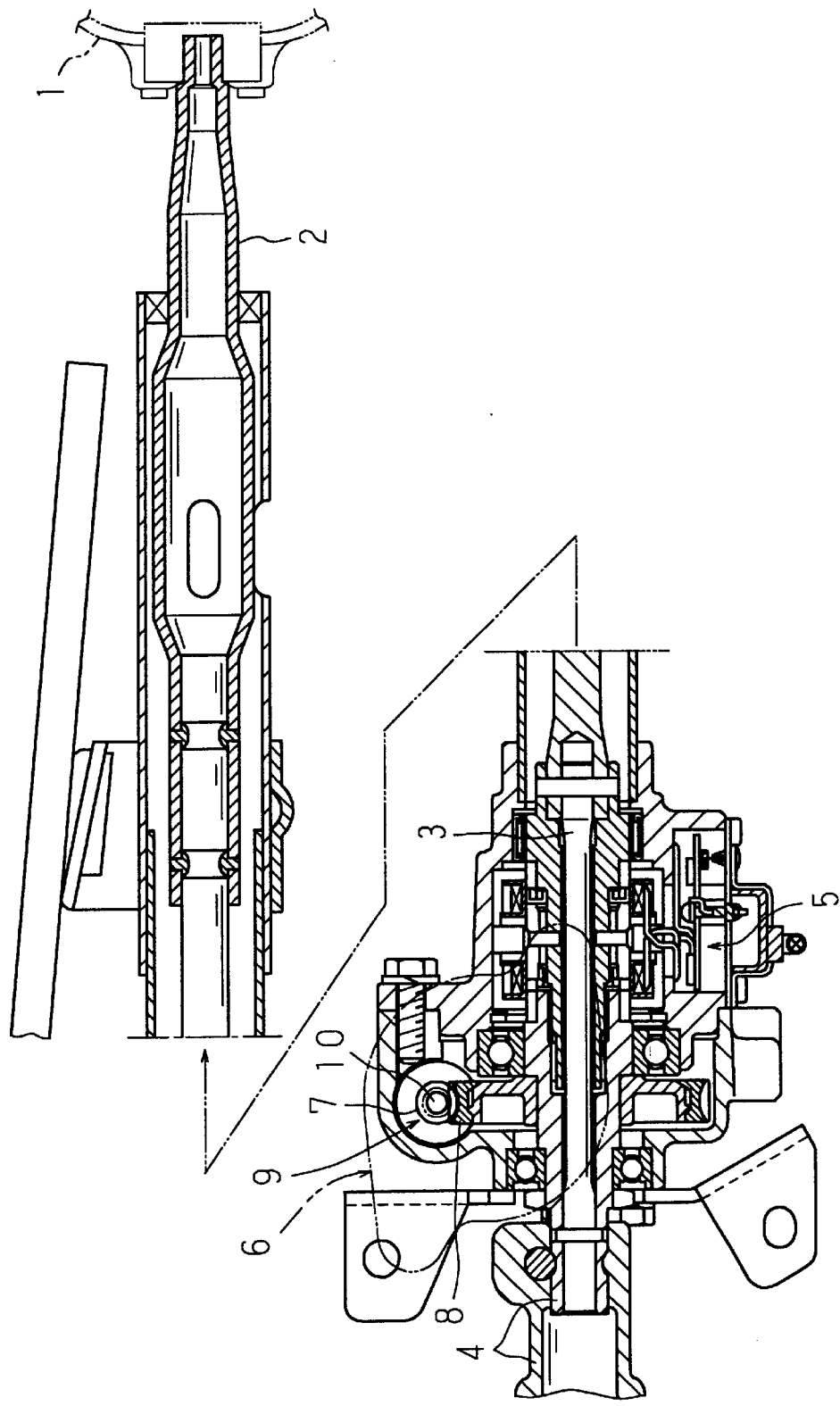
FIG. 1 is a schematic cross sectional view of a conventional electric power steering apparatus.
Figure 2:
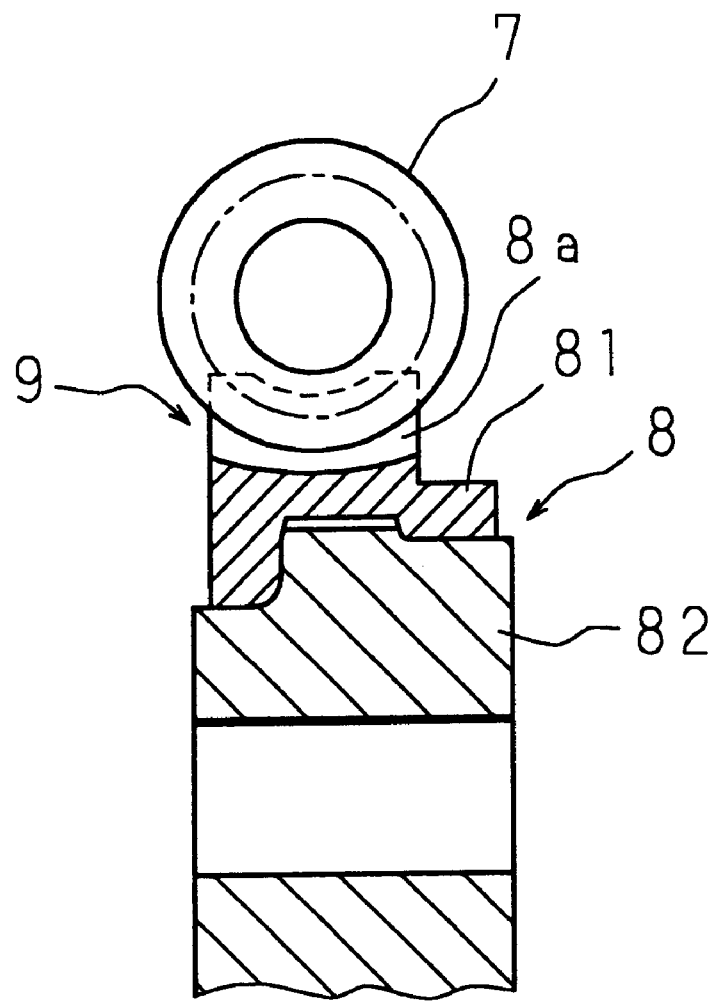
FIG. 2 is a detailed cross sectional view of a worm wheel in a conventional electric power steering apparatus.
Figure 3:
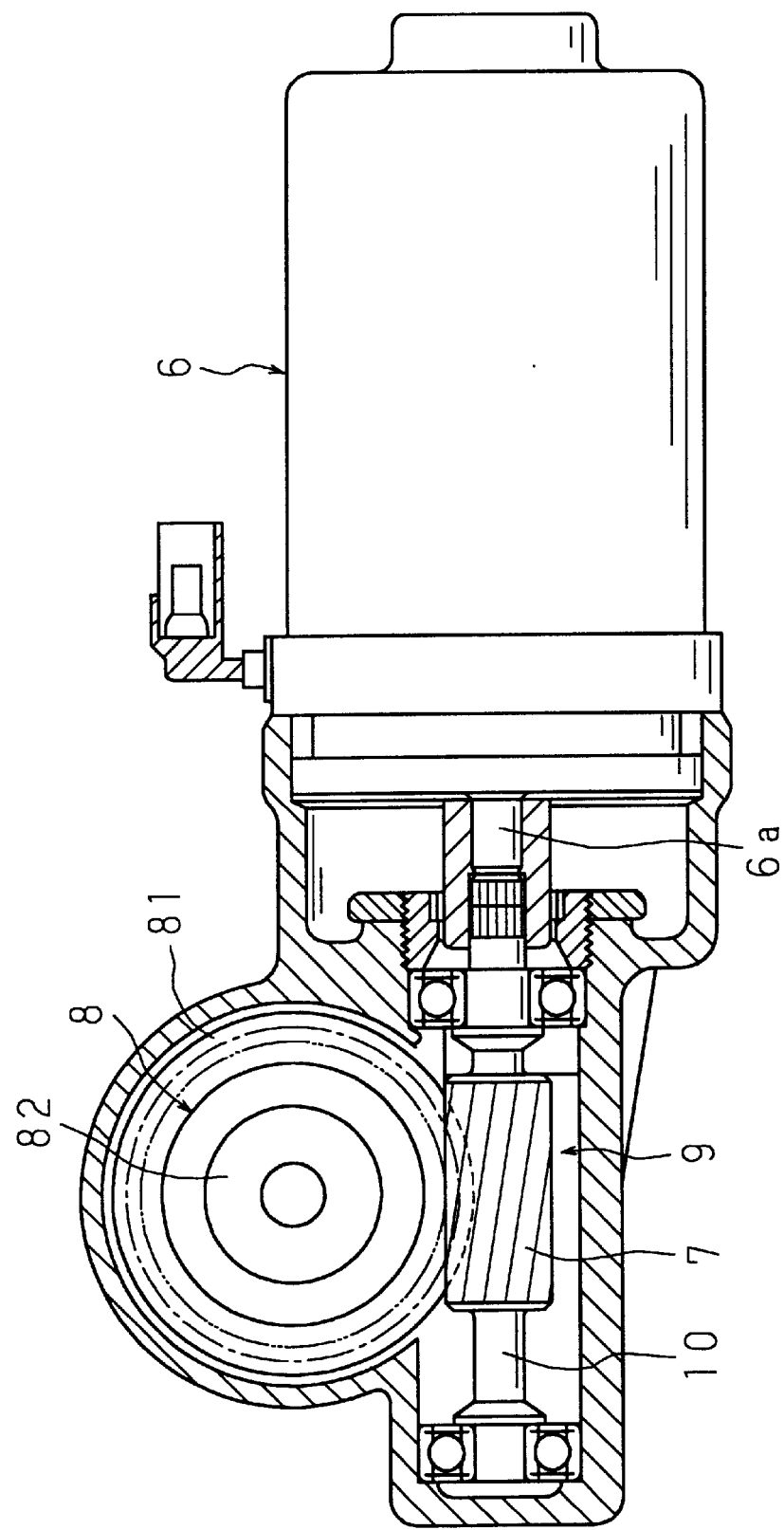
FIG. 3 is a partial cross sectional view of an electric steering apparatus according to the present invention, showing the structure of the portions of the reduction mechanism and the motor.
Figure 4:
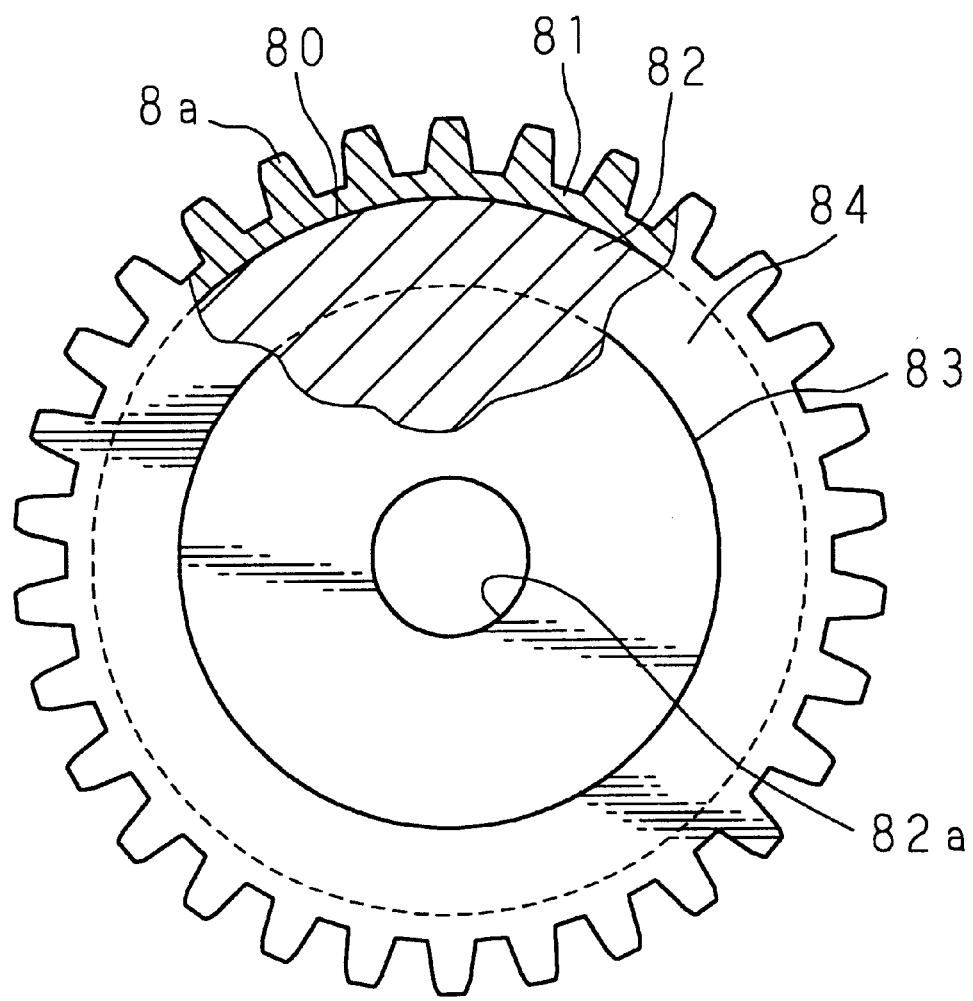
FIG. 4 is a detailed cross sectional view of the worm wheel of the electric steering apparatus according to the present invention.

FIG.3 is a partial cross sectional view of the electric steering apparatus according to the present invention, showing the structure of the portions of the reduction mechanism and the motor. FIG. 4 is a detailed cross sectional view of the worm wheel of the electric steering apparatus according to the present invention.

The reduction mechanism 9 comprises a worm 7 and a worm wheel 8, which engages with the worm 7. The worm 7 is integrally formed with the worm shaft 10 at the middle portion thereof. The worm shaft 10 is connected with an output shaft 6a of a motor 6 for steering assists and configured to cross the shaft axis of a second steering shaft 4. The worm wheel 8 is fitted and fixed to the middle portion of the second steering shaft 4.

The worm wheel 8 comprises an annular tooth portion 81 made of a synthetic resin material having a plurality of teeth 8a engaging with the worm 7, and a metal boss portion 82. The metal boss portion 82 fits in the inner surface of the annular tooth portion 81 by the injection molding. It a through a hole 82a penetrating at the center portion of the boss portion 82 the second steering shaft 4 is fitted.

Figure 5A:
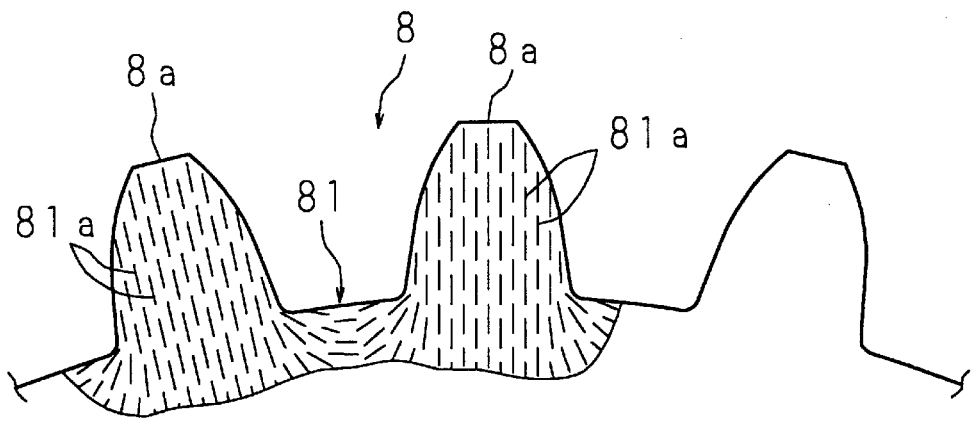
FIGS. 5A, 5B are partial detailed cross sectional views of the worm wheel of the electric steering apparatus according to the present invention.
Figure 5B:
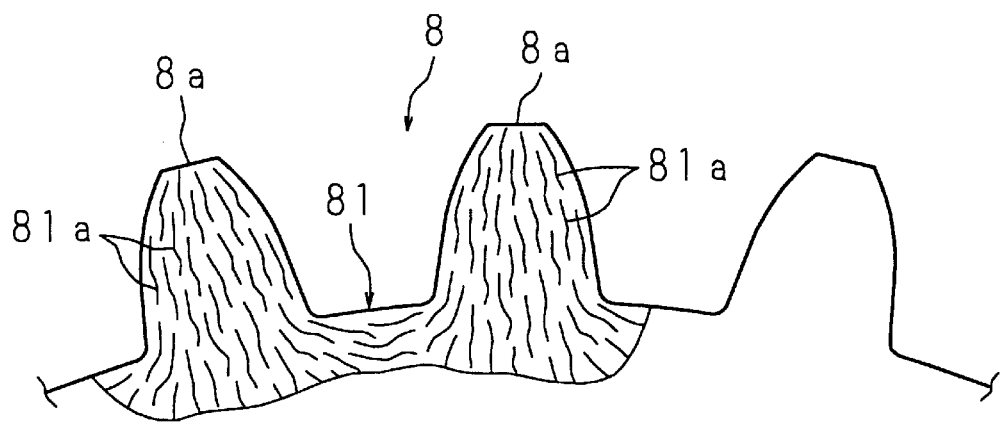

FIGS. 5A, 5B are detailed cross sectional views of the worm wheel. The annular tooth portion 81 is made of synthetic resin material, such as nylon resin, mixed with fibers 81a having a length of an aspect ratio between 100 and 800. For example, the fiber 81a is a glass fiber having a diameter of about 13 micrometers, a carbon fiber having a diameter of about 10 micrometers, or an aromatic nylon fiber having a diameter between about 10 and about 20 micrometers.

When the aspect ratio corresponding to the length of the fibers mixed into the synthetic resin material is between 100 and 800, the fatigue strength of the teeth and the root portion of the teeth can be increased, compared to a case that the aspect ratio is less than 100. For Example, when the aspect ratio corresponding to the length of the fibers is between about 100 and 200, as shown in FIG. 5A, the fibers can be preferably arranged in the direction crossing the direction of the torque, which is applied to the teeth 8a. And when the aspect ratio corresponding to the length of the fibers is between about 700 and 800, the fibers 81a are bent, as shown in FIG. 5B, at the injection by the injection screw and by the transportation resistance in the mould. Therefore, the fibers can be preferably arranged in the direction crossing the direction of the torque, which is applied to the teeth 8a.

The fatigue strength of the teeth and that of the root portion of the teeth increases, when the aspect ratio of the fibers mixed into the synthetic resin material is between 100 and 800. Therefore, the thickness of the annular tooth portion 81, namely the distance between the root portion of the teeth and the inner surface of the annular tooth portion, can be reduced compared to a case that the aspect ratio Corresponding to the length of fibers is less than 100.

As a result, the consumption of the synthetic resin material, which is more expensive than metal, can be reduced. Moreover, the time required for an injection molding for each product can be shortened so that the fabrication cost can be decreased.

Figure 6:
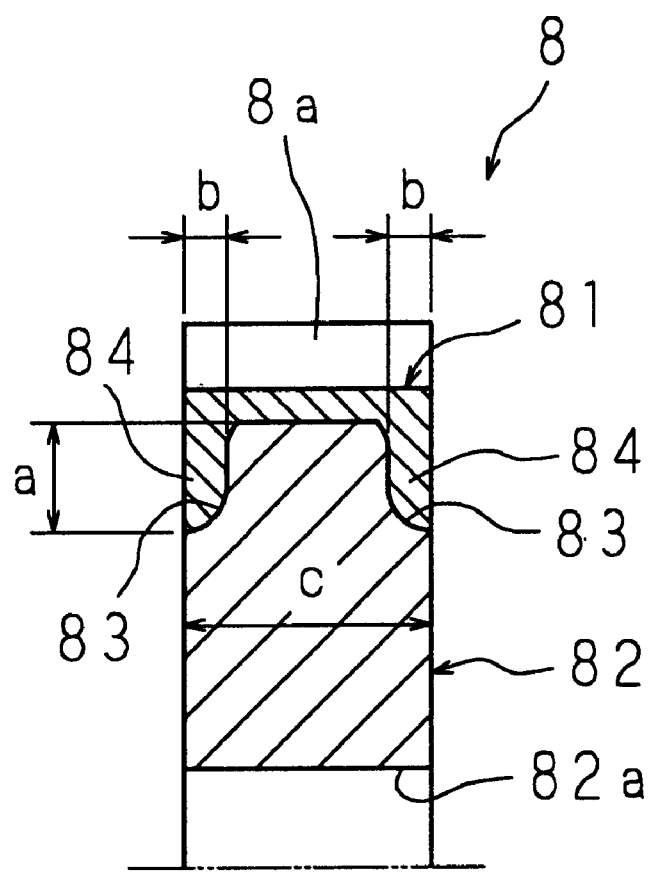
FIG. 6 is a detailed cross sectional view of the worm wheel of the electric steering apparatus according to the present invention.

FIG. 6 is a detailed cross sectional view of the worm wheel 8. A pair of annular recesses 83, 83 are formed at both ends of the boss portion 82 in the axial direction, and a pair of annular projecting portions 84, 84 are integrally formed at both ends of the annular tooth portion 81 in the axial direction. The boss portion 82 and the annular tooth portion 81 are engaging with each other through these annular recesses 83, 83 and the annular projecting portions 84, 84. The radial lengths (a) of the recesses 83, 83 and that of the projecting portions 84, 84 are designed to be 1 to 1.5 times of the axial lengths (b) of the recesses 83, 83 and that of the projecting portions 84, 84. The axial lengths (c) of the annular tooth portion 81 and that of the boss portion 82 are designed to be 2.5 to 6 times of the above-defined length (b).

The other structures and functions of the embodiment are identical to those of the prior art, therefore, the corresponding elements are referred to the identical reference numerals and the detailed explanation of the corresponding structures and the functions are omitted.

As this invention may be embodied in several forms without departing from the spirit of essential characteristic thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus comprising a motor for steering assists, a worm, a worm wheel having an annular tooth portion made of synthetic resin with teeth engaging with the worm and having a metal boss portion fitted in the inside of the annular tooth portion, and a steering shaft to which an output from the motor is transmitted through the worm and the worm wheel thereby to assist steering, wherein the annular tooth portion is prepared by injection molding, and made of the synthetic resin material mixed with aromatic nylon fibers having a length with an aspect ratio between 700 and 800, and the fibers are arranged in a direction crossing the direction of the torque, which is applied to the teeth when the teeth engage with the worm.

* * * * *